US012290954B2

(12) United States Patent
Cattini

(10) Patent No.: US 12,290,954 B2
(45) Date of Patent: May 6, 2025

(54) KIT FOR OBTAINING A CARPET OF BRUSHES FOR A MACHINE FOR THE AUTOMATIC CUTTING OF FABRICS

(71) Applicant: FK GROUP S.P.A., Dalmine (IT)

(72) Inventor: Flavio Cattini, Dalmine (IT)

(73) Assignee: FK GROUP S.P.A., Dalmine (IT)

( * ) Notice: Subject to any disclaimer, the term of this patent is extended or adjusted under 35 U.S.C. 154(b) by 422 days.

(21) Appl. No.: 17/773,872

(22) PCT Filed: Nov. 3, 2020

(86) PCT No.: PCT/IB2020/060285
§ 371 (c)(1),
(2) Date: May 3, 2022

(87) PCT Pub. No.: WO2021/094868
PCT Pub. Date: May 20, 2021

(65) Prior Publication Data

US 2023/0023367 A1 Jan. 26, 2023

(30) Foreign Application Priority Data

Nov. 14, 2019 (IT) ........................ 102019000021135

(51) Int. Cl.
*B26D 7/20* (2006.01)
*B26D 7/01* (2006.01)

(52) U.S. Cl.
CPC ............... *B26D 7/20* (2013.01); *B26D 7/015* (2013.01)

(58) Field of Classification Search
CPC ............. B26D 7/20; B26D 7/015; B26D 7/01
USPC ........................................................... 83/451
See application file for complete search history.

(56) References Cited

U.S. PATENT DOCUMENTS

| | | | | |
|---|---|---|---|---|
| 5,730,431 A | | 3/1998 | Cattini | |
| 5,807,229 A | * | 9/1998 | Febel | B31D 5/0047 493/464 |
| 2007/0227217 A1 | * | 10/2007 | Halamoda | B26F 1/24 29/829 |
| 2022/0203570 A1 | * | 6/2022 | Balsells Mercade | B26D 7/20 |

FOREIGN PATENT DOCUMENTS

| | | | | |
|---|---|---|---|---|
| CS | 389389 A1 | | 8/1990 | |
| DE | 102007018782 A1 | | 10/2008 | |
| EP | 1331070 A1 | | 7/2003 | |
| EP | 1897665 A1 | * | 3/2008 | A41H 15/00 |
| FR | 2680999 A1 | | 3/1993 | |

OTHER PUBLICATIONS

International Search Report, issued in PCT/IB2020/060285, mailed Feb. 26, 2021, Rijswijk, NL.

* cited by examiner

*Primary Examiner* — Nhat Chieu Q Do
(74) *Attorney, Agent, or Firm* — ArentFox Schiff LLP; Michael Fainberg

(57) ABSTRACT

A kit for obtaining a carpet of brushes on a table of a machine for automatic cutting of fabrics is provided. The kit has a plurality of brushes placeable side-by-side to form the carpet of brushes, and a plurality of needles for locking the fabrics. Each brush is provided with a base in which a plurality of base holes is formed, where the needles are inserted with shape and/or force coupling.

8 Claims, 6 Drawing Sheets

KIT FOR OBTAINING A CARPET OF BRUSHES FOR A MACHINE FOR THE AUTOMATIC CUTTING OF FABRICS

CROSS-REFERENCE TO RELATED APPLICATIONS

This application is a National Phase Application of PCT International Application No. PCT/IB2020/060285, having an International Filing Date of Nov. 3, 2020 which claims priority to Italian Application No. 102019000021135 filed Nov. 14, 2019, each of which is hereby incorporated by reference in its entirety.

FIELD OF THE INVENTION

The present invention relates to the field of machines for the automatic cutting of fabrics, in particular fabrics with printed rows, squares or panels, which, for the simultaneous cutting of several fabrics or overlapping fabric plies forming a lay, require a perfect alignment between the drawings of the various plies in order to obtain a high quality item.

In particular, the invention relates to a kit of brushes and needles for forming a carpet of brushes for such machines, to a cutting machine and to a method for locking a lay of plies on a carpet of brushes.

BACKGROUND OF THE INVENTION

EP 1 331 070 A1 suggests a machine for the automatic cutting of fabrics provided with a needle system suitable to allow a locking of the mutually aligned plies on a carpet of brushes. The needles are positioned below the carpet of brushes and are movable by a mechanical system between a raised position, in which they emerge from the carpet of brushes to lock the lay to be cut in place, and a lowered position, in which they remain below the carpet of brushes to allow the passage of the cutting blade between the bristles of the brushes.

If, on the one hand, such a technical solution rather effectively resolves the problem of locking the plies by keeping them aligned with one another, on the other hand it has proven to be too rigid with regard to the position and number of needles. Indeed, in certain cases, the drawings of the plies, which are to be perfectly aligned with one another, are in areas of the carpet of brushes which are distant from the locking needles, for example between nearby needles. Although the plies are perfectly locked, and therefore aligned, misalignments between the plies could occur at and close to the needles, in the intermediate areas, which even if minimum, could affect the quality of the end product if there are graphic patterns in such intermediate areas. In these cases, it would be desirable to position the needles according to the position of the graphic patterns on the fabrics, but the connection of the needle grid to the mechanical movement system does not allow any flexibility in the positioning and number of the needles with respect to the carpet of brushes.

SUMMARY OF THE INVENTION

It is the object of the present invention to obviate the above limitations of the machine for cutting fabrics according to the known art.

Such an object is achieved by a kit for obtaining a carpet of brushes on a table of a machine for automatic cutting of fabrics, a brush, a machine for automatic cutting of fabrics, and a method for locking fabrics as described and claimed herein. Advantageous embodiments of the present invention are also described.

BRIEF DESCRIPTION OF THE FIGURES

The features and advantages of the kit, brush, machine, and method according to the invention will in any case become apparent from the following description of preferred embodiments thereof, given only by way of a non-limiting, indicative example, with reference to the accompanying drawings, in which.

DETAILED DESCRIPTION

Figure 1:
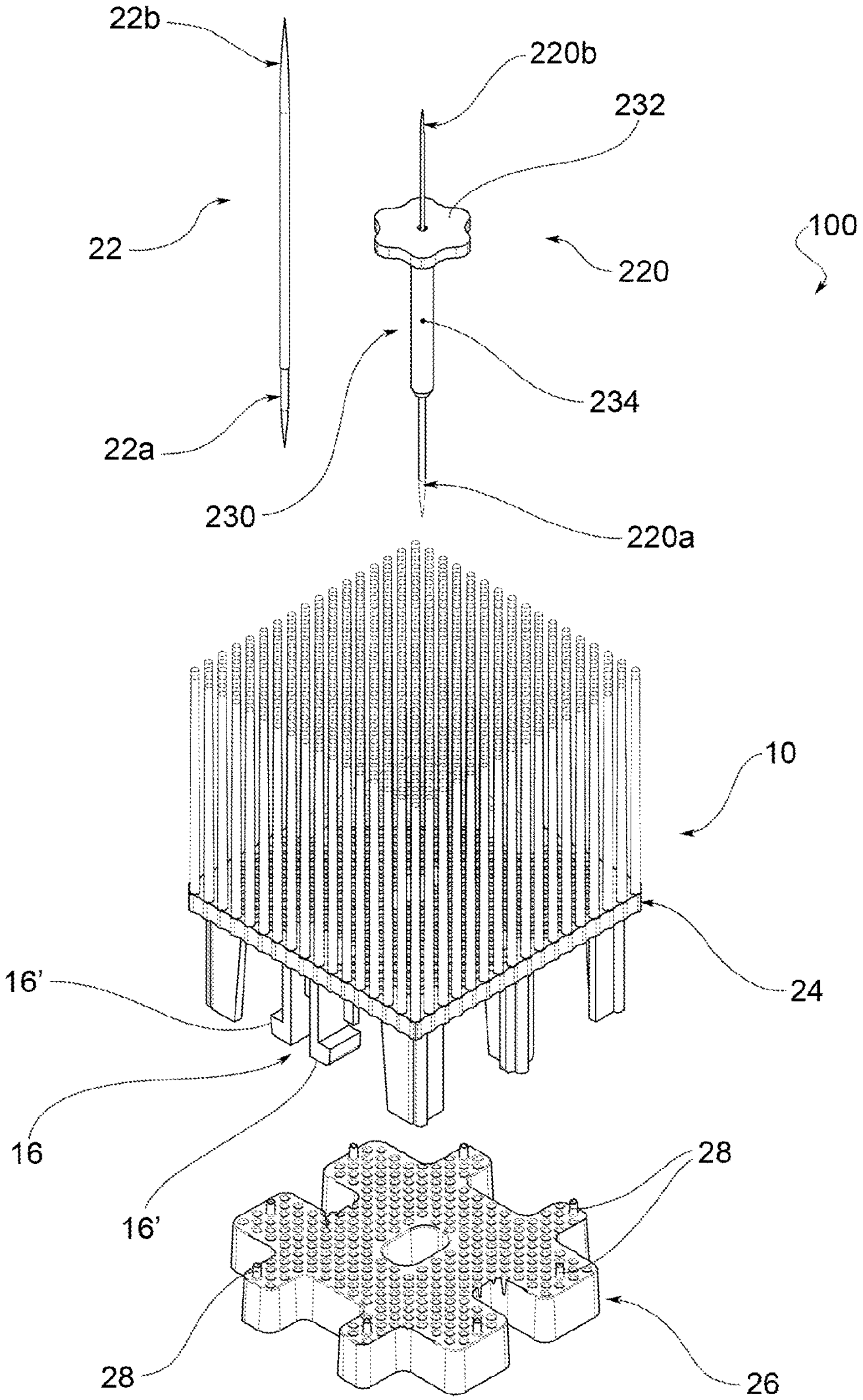
FIG. 1 is an exploded perspective view of a kit for obtaining a carpet of brushes according to the invention.
Figure 2:
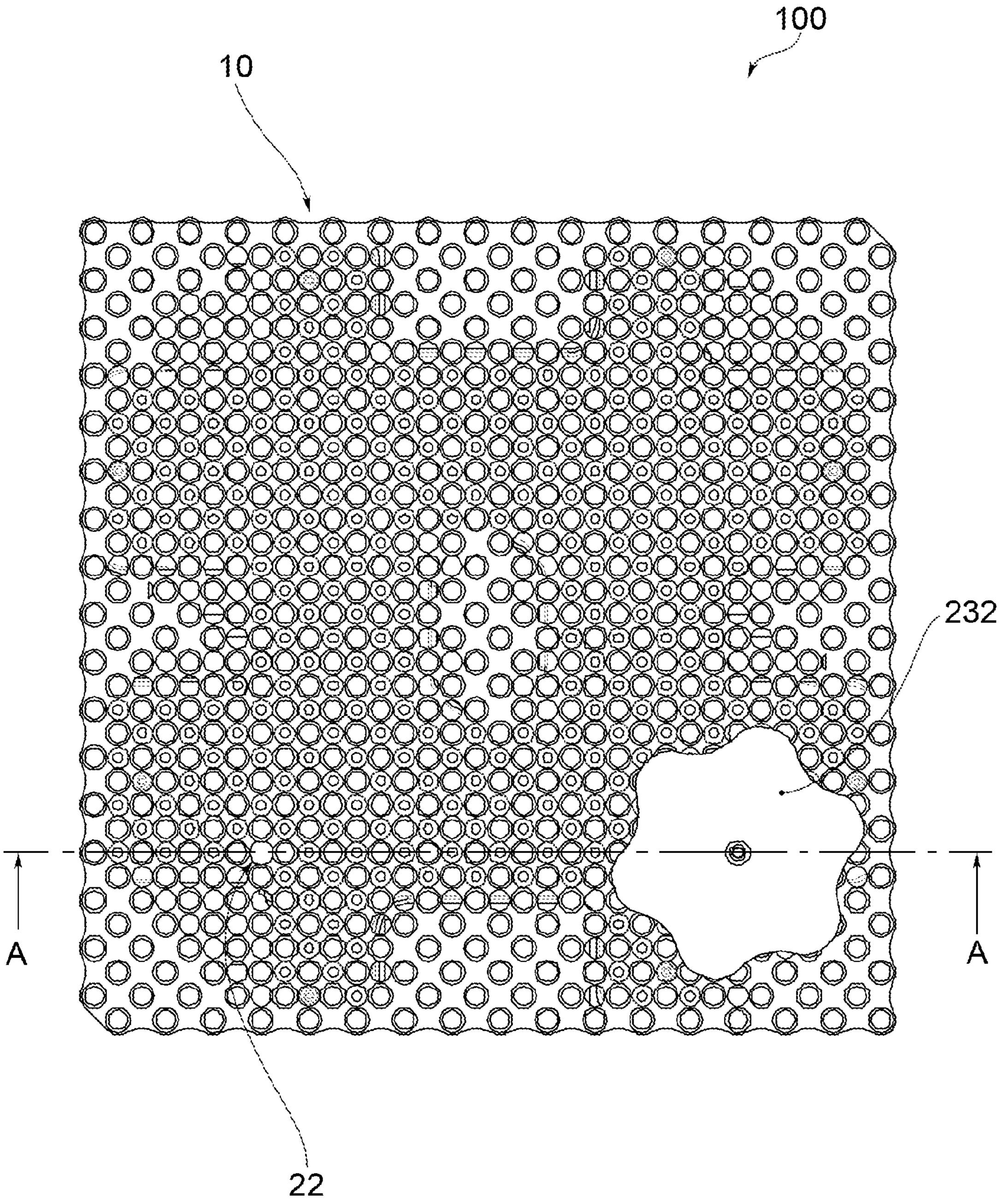
FIG. 2 is a top plan view of the kit in FIG. 1.
Figure 3:
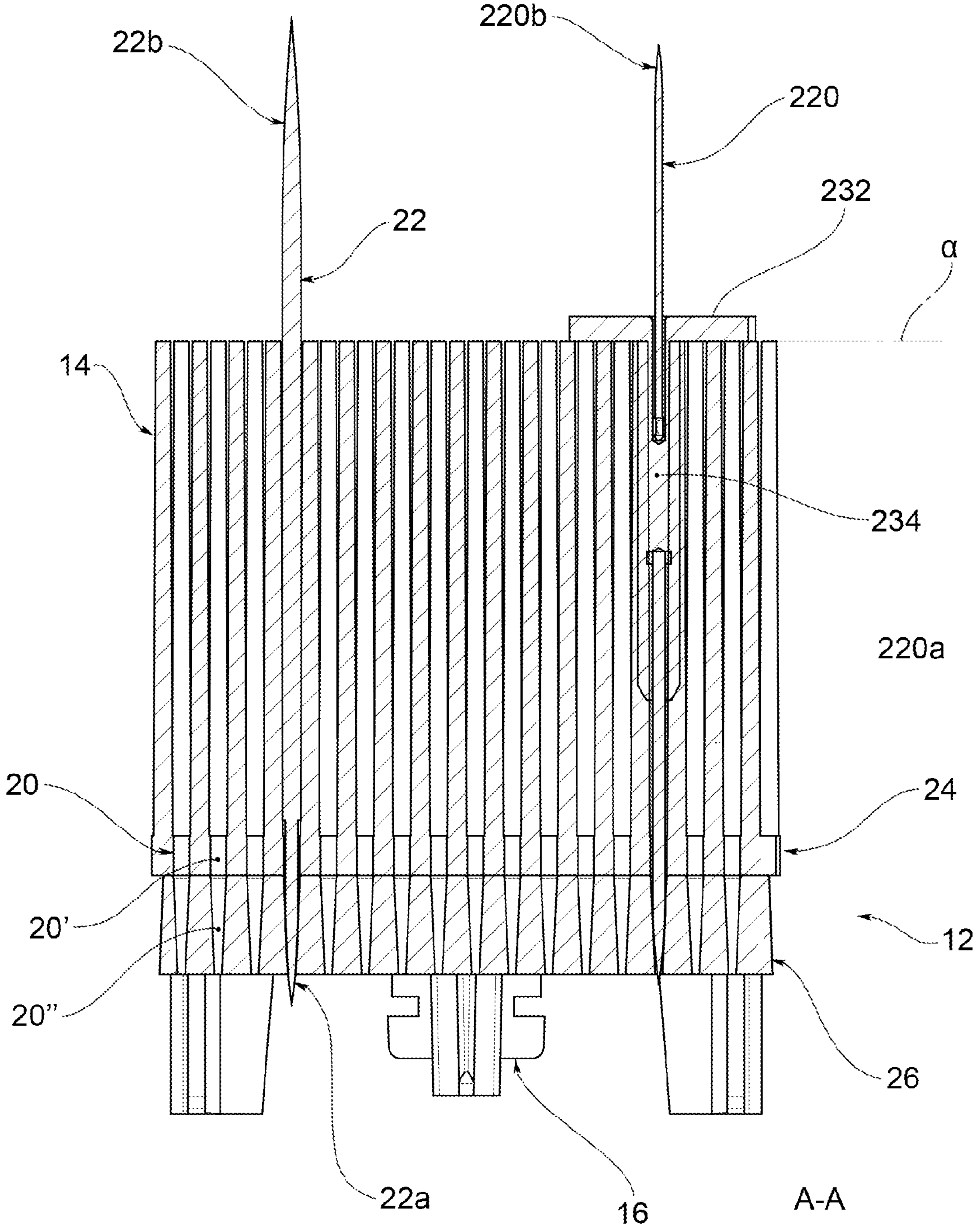
FIG. 3 is a longitudinal section of the kit along line A-A in FIG. 2.
Figure 4:
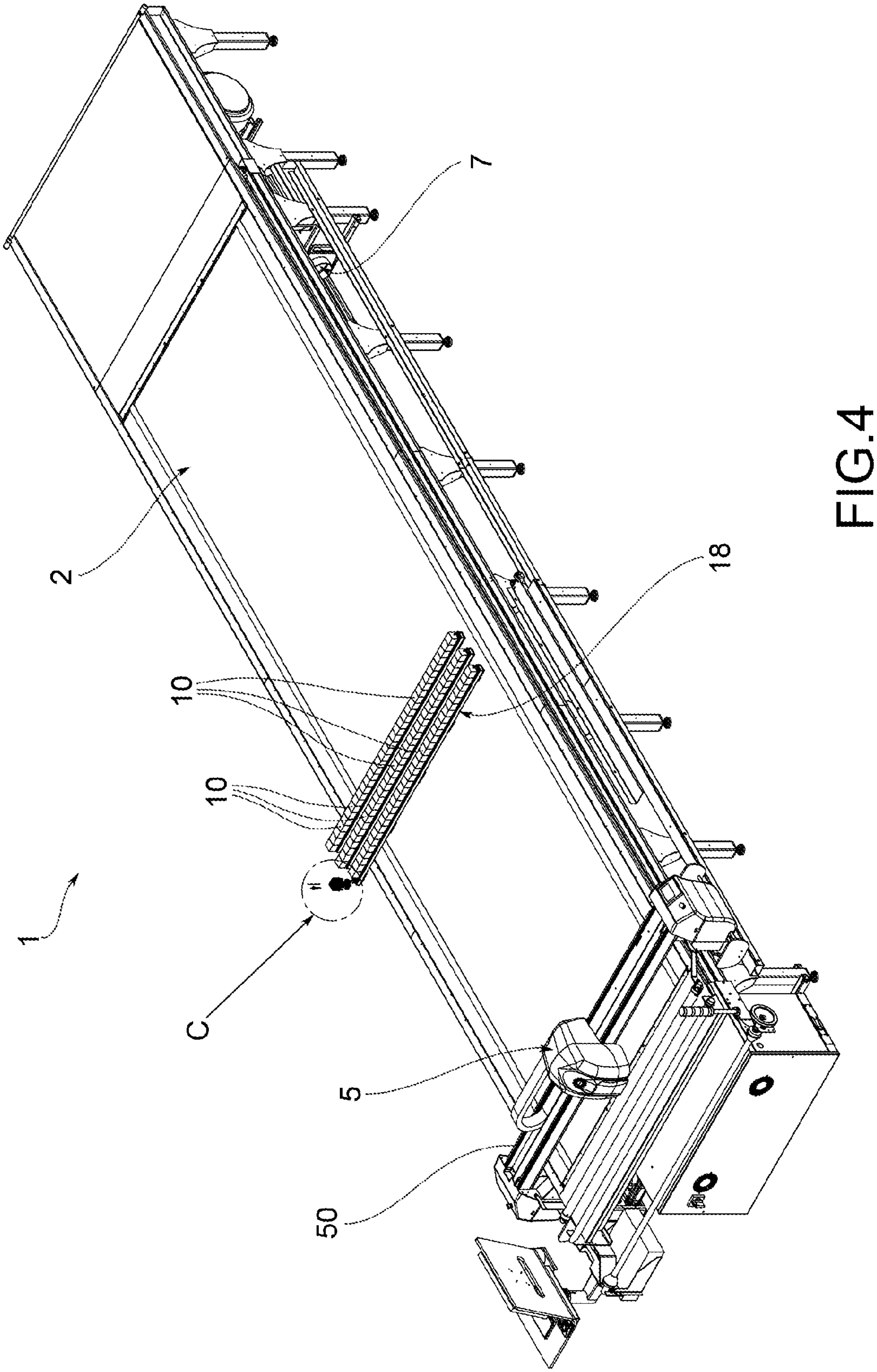
FIG. 4 is a perspective view of a machine for the automatic cutting of fabrics according to the invention, in which the table is partially covered by brushes.
Figure 4A:
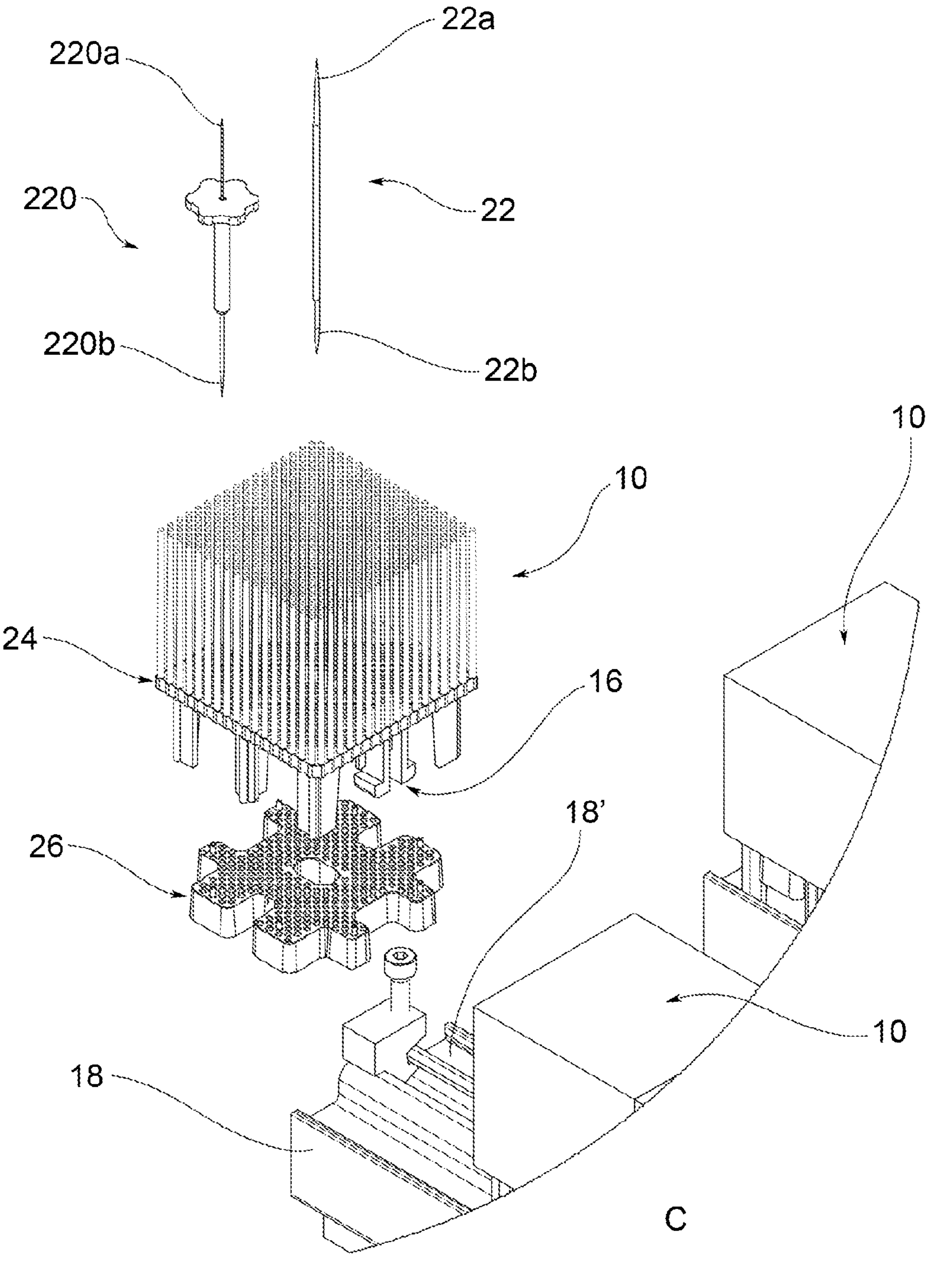
FIG. 4*a* is an enlarged view of the detail C circled in FIG. 4.
Figure 5:
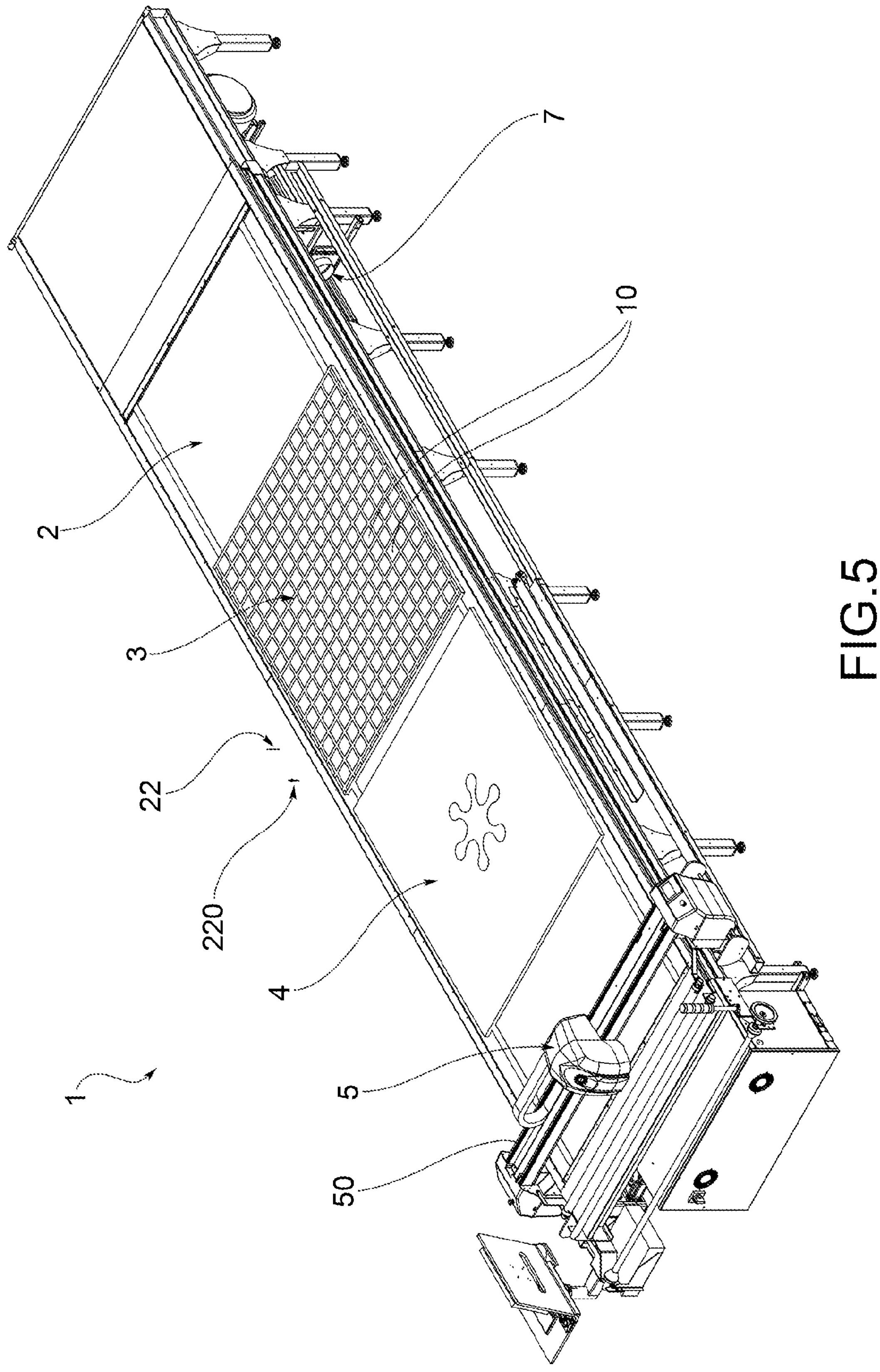
FIG. 5 is a perspective view of the machine in FIG. 4, with a lay of plies positioned on the carpet of brushes.

In said drawings, a kit for obtaining a carpet 3 of brushes on a table 2 of a machine 1 for the automatic cutting of fabrics 4 is indicated by numeral 100.

In a general embodiment, kit 100 comprises a plurality of brushes 10 and a plurality of fabric locking needles 22; 220.

The brushes 10 are shaped so as to be placeable side-by-side to form the carpet 3 of brushes. For example, the brushes 10 have a square or rectangular plan.

Each brush 10 comprises a base 12, a plurality of bristles 14 which extend from the base 12 and which form, with their respective upper ends, a bristle plane ($\alpha$) for supporting fabric plies 4 to be cut, and table coupling means 16 suitable to be connected to brush support crossbars 18 provided on the table 2 of the machine 1.

A plurality of base holes 20 extending parallel to the bristles 14 and which are open at least at the upper end facing the bristles 14 is formed in base 12.

Each needle 22; 220 has a lower point 22*a*; 220*a* and an upper point 22*b*; 220*b*. The lower point 22*a*; 220*a* is suitable to be inserted with shape and/or force coupling into at least one portion of a base hole 20 so that the needle is rigidly supported by base 12. The upper point 22*b*; 220*b* protrudes vertically from the plurality of bristles 14 when needle 22; 220 is inserted into the brush so as to pierce a plurality of overlapping plies (referred to as a "lay" as a whole) positioned on the bristle plane. Rigidly supported needle means that the needle is capable of keeping its vertical position when it is engaged by the lay resting on the bristle plane.

Therefore, once the carpet 3 of brushes is formed, the needles can be inserted into the carpet in desired numbers and positions, without any restrictions, for example according to the graphic patterns on the fabrics.

In an embodiment, the bristles 14 and the base holes 20 alternate with one another and are uniformly distributed over the plane defined by the upper side of base 12 of the brush.

This allows the whole surface of the carpet of brushes to be taken advantage of. Moreover, the uniform distribution of holes and bristles facilitates obtaining the brushes by plastic material molding.

In an embodiment, each base hole 20 has an open upper portion 20', for example cylindrical in shape, and a lower portion 20" which forms a support surface for a locking needle inserted into the base hole 20. For example, the lower portion 20" is conical in shape with a cross-section decreasing downwards.

In an embodiment, the lower point 22*a*; 220*a* of the needle is conical in shape to be suitable to obtain a shape and/or force coupling with the lower portion 20" of the base hole 20.

A solid, both axial and radial locking of the needles in the respective holes is obtained by virtue of the conical shape of the lower portion 20".

According to one embodiment, base 12 comprises an upper plate 24 penetrated by the base holes 20 and a lower counter-plate 26 connected to the upper plate 24. Abutment means 20" engageable by the lower point 22*a*; 220*a* of the needle are obtained in the lower counter-plate 26.

For example, the lower portion 20" of each base hole 20 is obtained in the lower counter-plate 26 and forms the abutment means 20".

In an embodiment, the lower counter-plate 26 is removably connected to the upper plate 24, for example by means of interlocking coupling.

In an embodiment, the table coupling means 16 are obtained in the upper plate 24 and protrude at the bottom beyond the lower counter-plate 26.

For example, the table coupling means 16 comprise a pair of arms 16' suitable to elastically engage a track 18' obtained in the brush support crossbars 18.

In an embodiment, the lower counter-plate 26 is provided with reference means 28, for example in the shape of a peg vertically extending from the lower counter-plate 26, suitable to allow an alignment of the portion of the base holes 20 which penetrates the upper plate 24, for example the cylindrical upper portion 20', with the abutment means 20", for example the conical lower portion.

In an embodiment, at least some (220) of the needles 20; 220 for locking the fabric comprise a needle holder 230 with a small plate 232 suitable to rest on the bristle plane α and a shank 234 which extends below the small plate 232 and which is suitable to be inserted between the bristles 14. An upper needle part 220*b* suitable to pierce the plurality of overlapping plies is inserted into the small plate 232; a lower needle part 220*a* suitable to engage at least one portion of a respective base hole 20 with shape and/or force coupling, for example both the cylindrical upper portion 20' and the conical lower portion 20", is inserted into shank 234.

The above-described shape of needle 220 with support 230 contributes to further providing the vertical rigidity required to correctly process the fabrics resting on the carpet of brushes.

The needles can be made of steel, iron, or similar materials, of plastic materials and/or various types of resins. The needles can be shaped with different lengths and diameters, according to the requirements.

The present invention also relates to a brush 10 suitable to obtain a carpet 3 of brushes on a table 2 of a machine 1 for the automatic cutting of fabrics 4.

The brush 10 comprises a base 12, a plurality of bristles 14 which extend from base 12 and which form, with the respective upper ends thereof, a bristle plane (a) for supporting fabric plies to be cut, and table coupling means 16 suitable to be connected to brush support crossbars 18 provided on the table 2 of the machine 1.

A plurality of base holes 20 is also obtained in base 12, extending parallel to the bristles 14 and being open at least at the upper end facing the bristles so as to be suitable to receive a lower portion of locking needles of the plies inserted from the top into the base holes 20.

In an embodiment, the bristles 14 and the base holes alternate with one another and are uniformly distributed over the plane defined by the upper side of base 12 of the brush.

In an embodiment, each base hole 20 has an open upper portion 20', for example cylindrical in shape, and a lower portion 20" which forms a support surface for a locking needle inserted into the base hole 20. For example, the lower portion 20" is conical in shape with a cross-section decreasing downwards.

In an embodiment, base 12 comprises an upper plate 24 penetrated by the upper portion 20' of base holes 20 and a lower counter-plate 26 removably connected to the upper plate 24. The lower portion 20" of each base hole 20 is obtained in the lower counter-plate 26.

In an embodiment, the table coupling means 16, for example comprising a pair of arms 16' suitable to elastically engage a track 18' obtained in the brush support crossbars 18, are obtained in the upper plate 24 and protrude at the bottom beyond the lower counter-plate 26.

In an embodiment, the lower counter-plate 26 is provided with reference means 28, for example in the shape of a peg, suitable to allow an alignment between the upper portion 20' of the base holes 20 and the lower portion 20" of the base holes 20.

The present invention also relates to a machine 1 for the automatic cutting of fabrics. Machine 1 comprises a table 2 and a cutting head 5 movable above the table, for example by an electric axis system 50. Table 2 is covered by a carpet 3 of brushes, consisting of a plurality of brushes 10 placed side-by-side as described above.

The cutting head 5 is provided with a cutting blade suitable to pass through the bristles 14 of the brushes to simultaneously cut plies of the lay resting on the bristle plane.

In an embodiment, table 2 is provided with brush support crossbars 18 to which the brushes 10 are connected by means of the table coupling means 16.

In an embodiment, machine 1 comprises, below table 2, suction means 7 facing the carpet 6 of brushes and suitable to hold a lay 4 of fabrics stacked against the bristle plane α.

The present invention also relates to a method for locking a lay 4 of fabrics on a carpet 3 of brushes of a machine for the automatic cutting of fabrics as described above.

The method comprises the steps of:

positioning the lay 4 of fabrics on the brush plane;

inserting a plurality of locking needles into the brushes, passing through the lay of fabrics at desired points in the lay;

activating means for locking the lay of fabrics to the carpet of brushes;

removing the locking needles.

In an embodiment, the locking means consist of suction means 7 placed below the table and suitable to suck the lay of fabrics against the bristle plane.

Those skilled in the art may make changes and adaptations to the embodiments of the kit, brush, machine and method according to the invention or can replace elements with others which are functionally equivalent in order to meet contingent needs without departing from the scope of the following claims. Each of the features described above as belonging to a possible embodiment can be implemented irrespective of the other described embodiments.

The invention claimed is:

1. A kit for obtaining a carpet of brushes on a table of a machine for automatic cutting of fabrics, the kit comprising:

a plurality of brushes placeable side by side to form the carpet of brushes, each brush comprising a base, a plurality of bristles extending from said base and forming, with respective upper ends, a bristle plane for supporting the fabrics to be cut, and table coupling means configured to connect to brush support crossbars provided on the table of the machine, wherein a plurality of base holes is formed in said base, the base holes extending parallel to the bristles and being open at least at an upper end facing the bristles; and a plurality of needles for locking the fabrics, each needle having a lower point and an upper point, the lower point being configured to engage with shape and/or force coupling at least one portion of a respective base hole so that the needle is rigidly supported by the base, the upper point protruding vertically from the plurality of bristles when the needle is inserted in the brush so as to pierce a plurality of overlapping fabrics or plies positioned on the bristle plane;

wherein each base hole has an open upper portion, and a lower portion that forms an abutment surface for a needle inserted in the base hole; and wherein the lower portion of the base hole has a conical shape with a cross-section decreasing downwards, and wherein the lower point of the needle has a conical shape for shape and/or force coupling with said lower portion of the base hole.

2. The kit of claim 1, wherein the bristles and the base holes alternate with one another and are uniformly distributed over a plane defined by an upper side of the base of the brush.

3. The kit of claim 1, wherein the base comprises an upper plate penetrated by a portion of the base holes and a lower counter-plate connected to the upper plate, abutment means engageable by the lower point of the needle being formed in said lower counter-plate.

4. The kit of claim 3, wherein the lower portion of each base hole is obtained in the lower counter-plate and forms the abutment means.

5. The kit of claim 4, wherein the lower counter-plate is connected in a removable way to the upper plate.

6. The kit of claim 5, wherein the lower counter-plate is equipped with reference means configured to allow an alignment of the portion of the base holes that penetrates the upper plate with the abutment means.

7. The kit of claim 3, wherein the table coupling means are formed in the upper plate and protrude below beyond the lower counter-plate.

8. The kit of claim 1, wherein at least some of the needles for locking the fabrics comprise a needle holder with a small plate suitable for resting on the bristle plane and a shank extending below said small plate and suitable for being inserted between the bristles, the upper point of the needle, configured to pierce the plurality of overlapping fabrics or plies, being inserted in the small plate; and the lower point of the needle, configured to engage with shape and/or force coupling at least one portion of the respective base hole, being inserted in the shank.

* * * * *